US012491523B2

(12) United States Patent
Rönnfeldt et al.

(10) Patent No.: US 12,491,523 B2
(45) Date of Patent: Dec. 9, 2025

(54) SPRAY MIST NOZZLE FOR FIRE-FIGHTING SYSTEMS, AND FIRE-FIGHTING SYSTEMS HAVING SAME

(71) Applicant: Minimax Viking Patent Management GmbH, Bad Oldesloe (DE)

(72) Inventors: Frank Rönnfeldt, Sühlen (DE); Stefan Schnell, Stockelsdorf (DE)

(73) Assignee: Minimax Viking Patent Management GmbH, Bad Oldesloe (DE)

( * ) Notice: Subject to any disclaimer, the term of this patent is extended or adjusted under 35 U.S.C. 154(b) by 762 days.

(21) Appl. No.: 17/614,185

(22) PCT Filed: Jun. 3, 2020

(86) PCT No.: PCT/EP2020/065276
§ 371 (c)(1),
(2) Date: Aug. 1, 2022

(87) PCT Pub. No.: WO2020/245146
PCT Pub. Date: Dec. 10, 2020

(65) Prior Publication Data

US 2022/0355315 A1 Nov. 10, 2022

(30) Foreign Application Priority Data

Jun. 3, 2019 (DE) ..................... 10 2019 114 868.5

(51) Int. Cl.
*B05B 1/34* (2006.01)
*A62C 35/68* (2006.01)
(Continued)

(52) U.S. Cl.
CPC ............ *B05B 1/3415* (2013.01); *A62C 35/68* (2013.01); *B05B 1/14* (2013.01); *B05B 1/3478* (2013.01); *B05B 15/65* (2018.02)

(58) Field of Classification Search
CPC ......... B05B 1/3415; B05B 15/65; B05B 1/14; B05B 1/3478; A62C 35/68
(Continued)

(56) References Cited

U.S. PATENT DOCUMENTS 1,259,052 A 3/1918 Starr
1,453,161 A * 4/1923 Murphy ............... B05B 1/3436 239/602
(Continued)

FOREIGN PATENT DOCUMENTS

CN 103120832 5/2013
CN 103285545 12/2016
(Continued)

OTHER PUBLICATIONS

International Searching Authority, International Search Report with English translation, International Application No. PCT/EP2020/065276, 6 pages; Aug. 26, 2020.
(Continued)

*Primary Examiner* — Christopher S Kim
(74) *Attorney, Agent, or Firm* — Perkins Coie LLP

(57) ABSTRACT

The invention relates to a spray mist nozzle, in particular an open high-pressure spray mist nozzle for firefighting systems, having a housing which is configured with an extinguishing fluid inlet and is configured with multiple recesses for receiving an exchangeable nozzle insert, such a nozzle insert being inserted into one, multiple/plural or all the recesses. The nozzle insert has a main body with a longitudinal axis that has in the longitudinal axis a spray mist outlet for the extinguishing fluid. An exchangeable swirl body is arranged in the main body and is configured to swirl the extinguishing fluid prior to the latter exiting from the spray mist outlet. The spray mist outlet has a minimum opening cross section, and has a widened exit cross section
(Continued)

5a,b downstream of the minimum opening cross section, wherein a transition from the minimum opening cross section to the exit cross section runs along a convexly curved surface.

26 Claims, 7 Drawing Sheets

(51) Int. Cl.
*B05B 1/14* (2006.01)
*B05B 15/65* (2018.01)

(58) Field of Classification Search
USPC ............... 239/472, 490, 491, 493, 500, 466; 169/16, 17
See application file for complete search history.

(56) References Cited

U.S. PATENT DOCUMENTS

| | | | | | |
|---|---|---|---|---|---|
| 2,428,748 | A * | 10/1947 | Barz | B05B 1/3478 | 239/472 |
| 4,125,226 | A * | 11/1978 | Nieuwkamp | B05B 1/3436 | 239/491 |
| 5,433,383 | A | 7/1995 | Sundholm | | |
| 6,129,154 | A | 10/2000 | Hoffmann et al. | | |
| 7,578,454 | B2 * | 8/2009 | Joo | A62C 31/05 | 239/487 |
| 2015/0352385 | A1 | 12/2015 | Fenton et al. | | |
| 2022/0355328 | A1 | 11/2022 | Rönnfeldt et al. | | |
| 2023/0044995 | A1 | 2/2023 | Rönnfeldt et al. | | |

FOREIGN PATENT DOCUMENTS

| | | |
|---|---|---|
| DE | 116398 | 11/1975 |
| DE | 4137136 | 5/1993 |
| DE | 20300845 U | 5/2003 |
| DE | 10214251 | 8/2003 |
| EP | 1 016 463 | 7/2000 |
| FR | 1331224 | 6/1963 |
| WO | WO2018006000 | 1/2018 |

OTHER PUBLICATIONS

International Searching Authority, Written Opinion with English translation, International Application No. PCT/EP2020/065276, 15 pages; Aug. 26, 2020.

* cited by examiner

SPRAY MIST NOZZLE FOR FIRE-FIGHTING SYSTEMS, AND FIRE-FIGHTING SYSTEMS HAVING SAME

PRIORITY CLAIM AND INCORPORATION BY REFERENCE

This application is a 35 U.S.C. § 371 application of International Application No. PCT/EP2020/065276, filed Jun. 3, 2020, which claims the benefit of German Application No. 10 2019 114 868.5, filed Jun. 3, 2019, each of which is incorporated by reference in its entirety.

TECHNICAL FIELD

The invention relates to a spray mist nozzle, in particular an open high-pressure spray mist nozzle for firefighting systems, having a housing which is configured with an extinguishing fluid inlet and is configured with multiple recesses for receiving an exchangeable nozzle insert, such a nozzle insert being inserted into one, multiple/plural or all the recesses, wherein the nozzle insert has a main body with a longitudinal axis that has in the longitudinal axis a spray mist outlet for the extinguishing fluid, wherein an exchangeable swirl body is arranged in the main body and is configured to swirl the extinguishing fluid prior to the latter exiting from the spray mist outlet.

BACKGROUND AND SUMMARY OF THE INVENTION

Spray mist nozzles of the type indicated above are known and are generally used for atomizing the extinguishing fluid into fine droplets having the greatest possible homogeneity and for distributing the extinguishing fluid atomized in this way into the spray mist to as large an area as possible of a monitored space. Here, it is basically sought to cover the largest possible spatial volume or spatial area with as little extinguishing agent as possible being used. With spray mist nozzles, it is always necessary for a balance to be struck with respect to the atomization effect thereof and the casting distance which can be achieved, in a manner dependent on the operating pressure and volumetric flow rate of conveyance, by the spray mist nozzles, when it comes to selecting the spray mist nozzle. Spray mist nozzles with a particularly fine formation of droplets, that is to say a strong atomization effect, have a smaller casting distance than nozzles with less intense swirling or a formation of larger droplets with less fine atomization. This interdependency is expressed by the so-called K-factor. The K-factor represents a nozzle constant and provides information about the quantity of water exiting from the sprinkler. It is determined using the following equation:

$$K=Q/\sqrt{p},$$

where Q is the volumetric flow rate in l/min and p is the static pressure before the nozzle in bar.

It has been observed, particularly at relatively high operating pressures above 30 bar, in particular in a range of 60 bar to 140 bar and in particular in the case of K-factors of below 1.0, that, for known spray mist nozzles, variations of the K-factor sometimes occur in the spray mist discharge. For the best possible predictability and reproducibility of the firefighting effect of a spray mist nozzle, it is however of great importance to obtain an operating behavior which is as constant as possible. This means that the K-factor of the nozzle has to be as constant as possible too.

Consequently, the invention was based on the object of improving a spray mist nozzle of the type indicated in the introduction to the extent that the above-described disadvantages are overcome as far as possible. In particular, the invention was based on the object of improving a spray mist nozzle of the type indicated in the introduction to the extent that the stability of the K-factor is improved.

The invention achieves the underlying object in the case of a spray mist nozzle, in particular in the case of an open high-pressure spray mist nozzle according to a first aspect of the invention. In particular, the invention provides a spray mist nozzle for firefighting systems of the type indicated in the introduction in which the spray mist outlet has a minimum opening cross section, and has a widened exit cross section downstream of the minimum opening cross section, wherein the transition from the minimum opening cross section to the exit cross section runs along a convexly curved surface. In other words, the point of the smallest opening cross section is not arranged directly at the exit cross section of the spray mist outlet, but rather is formed recessed to a certain extent in the main body of the nozzle insert, and, toward the exit cross section, the wall of the spray mist outlet is widened in a convexly shaped inverse funnel. Here, the invention makes use of the realization that, through the provision of a convexly curved surface between the point of the minimum opening cross section and the exit cross section, an unexpectedly marked stabilization of the discharge behavior of the spray mist nozzle is realized, and in particular a K-factor varying to a significantly lesser extent can be measured during the operation of the nozzle. The higher the operating pressure and the smaller the K-factor of the spray mist nozzle, the greater the extent to which this effect occurs.

The invention is advantageously refined in that the transition from the minimum opening cross section to the exit cross section runs smoothly, preferably with a constant surface curvature. According to the invention, smooth running is to be understood here and below as meaning that a transition without any sharp bends or jumps is realized. Preferably, the surface curvature downstream of the minimum opening cross section has a radius of curvature in a region of 0.5 mm or more, particularly preferably in a range of 0.7 mm to 0.8 mm. The above-described radii of curvature, despite appearing to be very small, have a surprisingly strong influence on the constancy of the K-factor.

In a further preferred embodiment, the spray mist outlet has a widened incident-flow cross section upstream of the minimum opening cross section. For the purpose of explanation, it should be stated here that, in a spray mist nozzle, the swirl body generally bears against a seat surface upstream of the exit opening and the seat surface extends as far as the beginning of the exit opening. Here, the incident-flow cross section is then that cross section at which the transition between seat surface and exit opening starts.

In conventional spray mist nozzles, the spray mist outlet is produced through the formation of a passage bore extending straight through the main body. According to the invention, according to this embodiment, not only is the outlet-side end of such an opening widened, but additionally the incident-flow-side end, opposite the outlet side, of the exit opening is also widened. The widening of the incident-flow cross section relative to the minimum opening cross section likewise results in a surprisingly positive influence being achieved, said influence further stabilizing the spray mist discharge with respect to the constancy of the K-factor.

In preferred refinements, the transition from the incident-flow cross section to the minimum opening cross section runs along a convexly curved surface. Preferably, the transition from the incident-flow cross section to the minimum opening cross section is realized smoothly, preferably with a constant surface curvature. Particularly preferably, the surface curvature upstream of the minimum flow cross section to the incident-flow cross section has a radius of curvature in the region of 0.5 mm or more, particularly preferably in a range of 0.7 mm to 0.8 mm. Very particularly preferably, the curvature between the incident-flow cross section and the exit cross section is smooth, particularly preferably the curvature from the incident-flow cross section to the exit cross section is constant.

The above-described effects of the stabilization of the K-factor are optimized and intensified even further by these configurations without disadvantages with regard to the discharge behavior having to be accepted. Although the manufacturing effort for the provision of a curved surface as described above is not negligible, it is justified by the improvement of the discharge behavior that is achieved.

The invention has been described above in a first aspect with the focus on the configuration of the spray mist outlet. In a second aspect, which is simultaneously a preferred embodiment of the above-described first aspect as well as a separate second aspect of the invention, the invention relates to a spray mist nozzle having a housing which is configured with an extinguishing fluid inlet and is configured with multiple recesses for receiving a nozzle insert, such a nozzle insert being inserted into one, multiple/plural or all the recesses, wherein the nozzle insert has a main body with a longitudinal axis that has in the longitudinal axis a spray mist outlet for the extinguishing fluid, wherein an exchangeable swirl body is arranged in the main body and is configured to swirl the extinguishing fluid prior to the latter exiting from the spray mist outlet.

Where the second aspect is considered to be an independent aspect, the invention achieves, in the case of such a spray mist nozzle, the object indicated in the introduction of improving the discharge behavior of the spray mist nozzle in that the swirl body has an inlet-side, first face side and an opposite outlet-side, second face side and is configured to guide a first part of the extinguishing fluid laterally along the swirl body and to swirl said first part, and furthermore has a passage opening which extends through the swirl body from the first face side to the second face side and which is aligned with the spray mist outlet of the main body and through which a second part of the extinguishing fluid flowing through the main body passes through the swirl body.

Where the second aspect is considered to be a preferred embodiment of the first aspect, the spray mist nozzle is advantageously refined in that the swirl body preferably has an inlet-side, first face side and an opposite outlet-side, second face side and is configured to guide a first part of the extinguishing fluid laterally along the swirl body and to swirl said first part, and furthermore has a passage opening which extends through the swirl body from the first face side to the second face side and which is aligned with the spray mist outlet of the main body and through which a second part of the extinguishing fluid flowing through the main body passes through the swirl body.

According to the second aspect, the invention makes use of the further realization that that part of the extinguishing fluid which passes through the swirl body through the passage opening and is not guided along the outer wall of the main body is, at least initially, swirled less intensely than the first part of the extinguishing fluid. After exiting the swirl body, however, the second part of the extinguishing fluid is also caught by the remaining extinguishing fluid, combined therewith, and subjected to a certain swirling, such that a sufficiently homogeneous spray mist exits through the spray mist outlet. In this spray mist, however, there are not only the finely atomized, small droplets but also larger droplets. As a result of this mixture, the spray mist nozzle achieves a greater casting distance and at the same time a constant K-factor.

The advantages and preferred embodiments of the spray mist nozzle according to the first aspect are at the same time preferred embodiments and advantages of the spray mist nozzle according to the second aspect, and for this reason, in this respect, reference is made to the above statements for the purpose of avoiding repetitions. In the following text, preferred embodiments are described for spray mist nozzles both of the first aspect and of the second aspect.

Preferably, the passage opening is oriented coaxially in relation to the spray mist outlet in the main body. Furthermore preferably, the passage opening has a passage cross section which is smaller than or the same size as the minimum exit cross section of the main body.

In a further preferred embodiment, the extinguishing fluid inlet defines a mounting direction, and one of the nozzle inserts is a first nozzle insert, which is oriented parallel to, preferably coaxially in relation to, the mounting direction. This means therefore that, for example in the case of a vertically mounted spray mist nozzle, the first spray mist outlet, likewise in the mounted state, is oriented vertically, preferably coaxially in relation to the fluid inlet.

In a further preferred embodiment, as an alternative or in addition to the above-described embodiment, in which the extinguishing fluid inlet thus defines a mounting direction, one, multiple or all the nozzle inserts are second nozzle inserts, which are oriented at a predetermined angle to the mounting direction, preferably at an angle of 55° to 70°, more preferably in a range of 57° to 68°, particularly preferably at an angle of 60° or 65°. Values from the upper half of the above-described angle ranges are suitable in particular if the widest possible region transverse to the mounting direction is to be covered with spray mist by the spray mist nozzle, while values from the lower half of the above-stated angle ranges are suitable primarily if the greatest possible casting distances are to be achieved with the spray mist nozzle.

In a further preferred embodiment, in the spray mist nozzle according to the invention, one or more of the recesses for the nozzle inserts are closed off by means of a closure element. The closure element is preferably in the form of a closure cap, blind plug or the like. In this way, for the respective usage purpose, recesses not required can be closed off. The matter of whether one or more of the recesses for the nozzle inserts are closed off instead of a nozzle insert being inserted can be established on-site by the fitter in the respective application.

In a first preferred embodiment of the spray mist nozzle, in which said spray mist nozzle has a first nozzle insert and one or more second nozzle inserts, the first spray mist outlet has a K-factor which is larger than that of the second spray mist outlet(s). Preferably, the K-factor of the first nozzle insert is three to four times as large as the K-factor of the second nozzle insert(s), or preferably lies in a range of 0.6 to 0.9. In a further preferred, alternative embodiment of a spray mist nozzle, having a first nozzle insert and one or more second nozzle inserts, the nozzle inserts each have the same K-factor, preferably in a range of 0.2 to 0.5. The spray mist nozzle according to the invention according to the first and/or second aspect is preferably designed for an operating pressure in a region of 30 bar or higher, preferably in a range of 30 bar to 70 bar, more preferably of 50 bar to 65 bar. For such a design, it is preferably the case that corresponding wall thicknesses and material selections for the individual parts of the spray mist nozzle are selected. In a further preferred embodiment, the spray mist nozzle is formed partly or completely from high-grade steel.

In a further preferred embodiment of the invention, the spray mist nozzle is in the form of a sprinkler in that there is inserted into a first one of the recesses a sprinkler insert having a blocking body which can be moved back and forth between a closed state and a release state and which is configured to separate the extinguishing fluid inlet from the remaining recesses in the closed state and to connect the extinguishing fluid inlet to the remaining recesses in a fluid-conducting manner in the release state. The housing of the spray mist nozzle according to the invention thus makes it possible, in an extraordinarily simple manner, for an open spray mist nozzle to be converted into a sprinkler and vice versa, or for the same housing to be used for both application areas.

Preferably, the first recess is oriented in the mounting direction (M). In a further preferred configuration, in addition to the first recess, which receives the sprinkler insert, the housing has four or more, preferably six or more, second recesses, which are oriented at an angle to the first recess and are preferably distributed uniformly along the circumference of the spray mist nozzle.

The invention has been described above in a first aspect and a second aspect with reference to a spray mist nozzle.

In a further aspect, the invention furthermore also relates to a firefighting system having an extinguishing fluid supply line, a line network with one or more open spray mist nozzles installed in the line network, and a valve station which is configured to be actuated in the event of a fire in order to connect the extinguishing fluid supply line to the line network in a fluid-conducting manner and, in this way, to supply the one or more spray mist nozzles with extinguishing fluid.

The invention achieves, in the case of such a firefighting system, the object indicated in the introduction in that one, multiple or all the spray mist nozzles are configured according to one of the above-described preferred embodiments.

Preferably, the firefighting system with open spray mist nozzles or sprinklers according to the invention is used, according to requirement, in an air extraction system, for example for cooking areas or air-conditioning systems, or at parking decks on ships, in particular in the roll-on/roll-off area there. Alternatively, use in property protection installations or in painting installations and also as a replacement wherever gas/special extinguishing systems have hitherto been used is expedient.

BRIEF DESCRIPTION OF THE DRAWINGS

The invention will be described in more detail below on the basis of preferred exemplary embodiments and with reference to the appended figures. In the figures:

FIGS. 1A-C, FIGS. 3*a-c* show different schematic illustrations of a main body of the nozzle insert as per FIG. 2.

MODE(S) FOR CARRYING OUT THE INVENTION

Figure 1A:
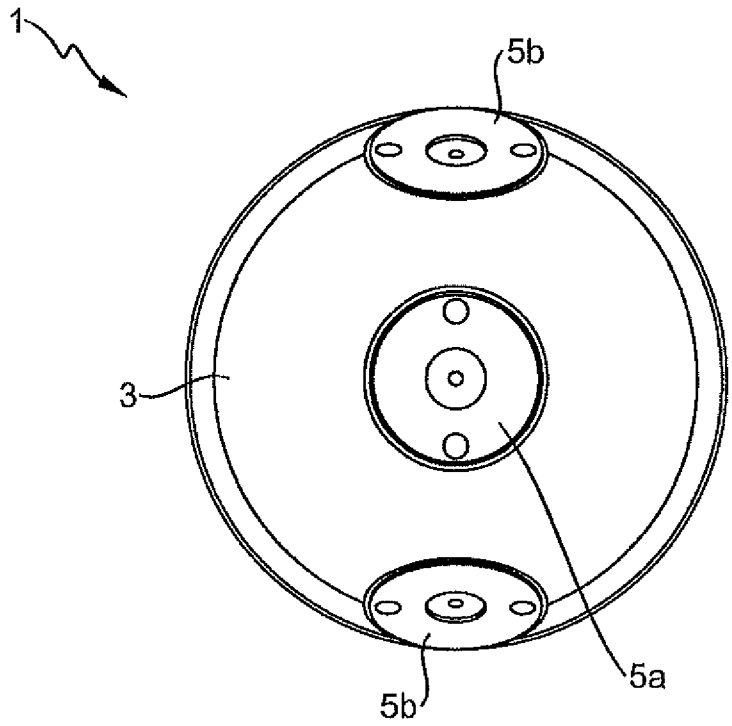
FIGS. 1*a-c* show different schematic illustrations of a spray mist nozzle as per a first preferred exemplary embodiment.

FIG. 1*a* shows a high-pressure spray mist nozzle 1. The spray mist nozzle 1 has a housing 3 into which a first nozzle insert 5*a* and two second nozzle inserts 5*b* have been inserted.

Figure 1B:
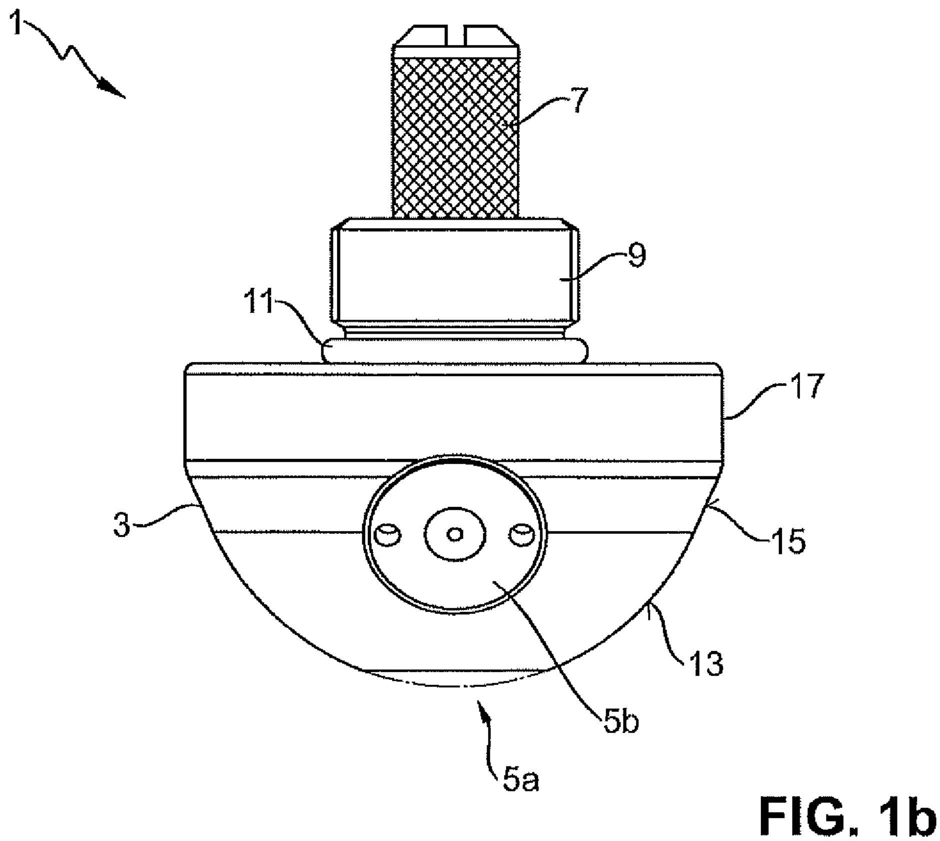

FIG. 1*b* illustrates the high-pressure spray mist nozzle 1 in a side view. On the inlet side, the spray mist nozzle 1 has a screen body 7. The housing 3 has a screw-in thread 9 for installing the spray mist nozzle. A seal ring 11 is provided for sealing off the housing 3 with respect to the installation body. The housing has a convexly curved, preferably partially spherical, surface portion 13, which is adjoined by a frustoconical surface portion 15. Toward the inlet side, the housing 3 has a cylindrical surface portion 17. The nozzle inserts end substantially flush with the surface of the housing 3.

Figure 1C:
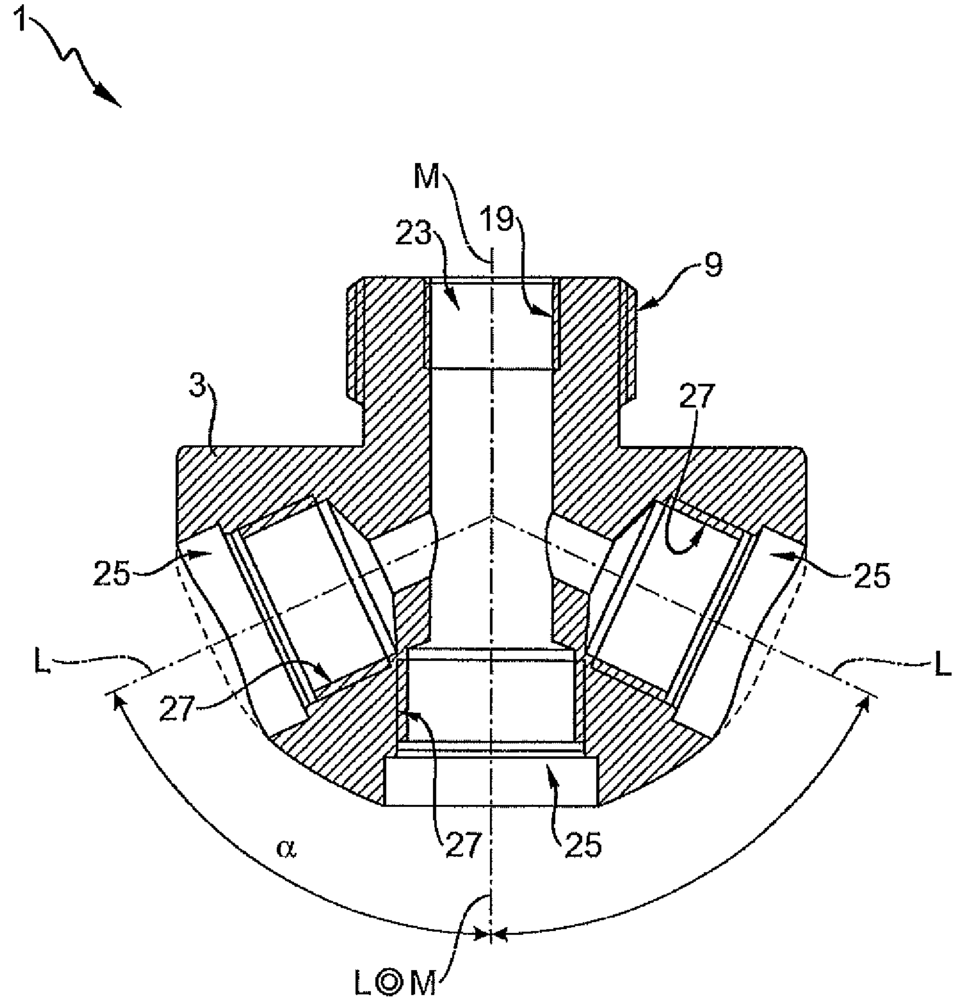

FIG. 1*c* shows a cross-sectional view through the housing 3 of the spray mist nozzle 1. The housing 3 has an inlet 23. Provided on the inner side of the fluid inlet 23 is an inner thread 19 for mounting the screen body 7 (cf. FIG. 1*b*).

The housing has multiple recesses 25 for receiving in each case one nozzle insert 5*a, b*. The recesses 25 each have an inner thread 27 for screwing in the nozzle inserts 5*a, b*. Furthermore, the nozzle inserts 5*a, b* are connected in a fluid-conducting manner to the fluid inlet 23.

One of the recesses 25 is oriented coaxially in relation to a mounting direction M defined by the extinguishing fluid inlet 23, with the result that the longitudinal axis L of the nozzle insert 5*a* to be inserted into the recess 25 is likewise oriented coaxially in relation to the mounting direction. The remaining recesses 25 are oriented at an angle α to the mounting direction M. The angle α preferably lies in a range between 50° and 70°, particularly preferably is 60° or 65°.

Figure 2:
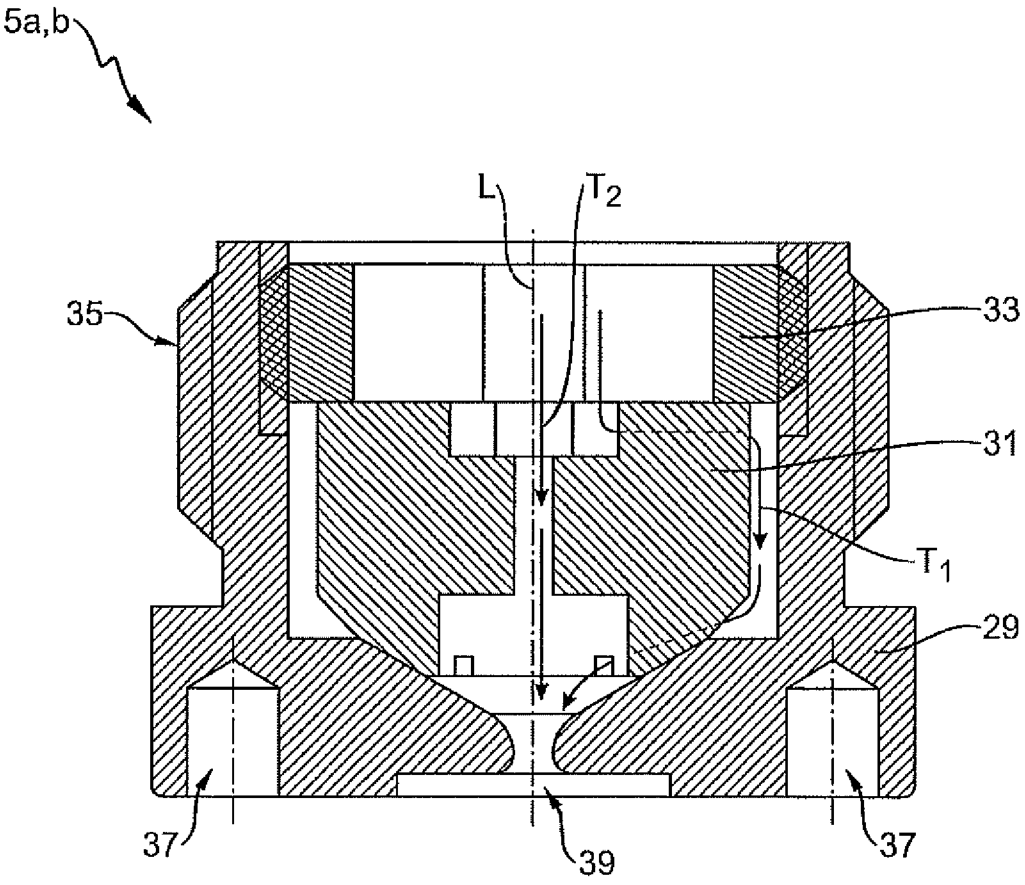
FIG. 2 shows a schematic cross-sectional view through a nozzle insert for the spray mist nozzle as per

While FIGS. 1*a-c* focused on the housing, FIG. 2 now shows the nozzle insert 5*a, b* which is intended to be inserted into the recesses 25. The nozzle insert 5*a, b*, hereinafter also "nozzle insert 5" for short, has a main body 29. A swirl body 31 is inserted in the main body 29 and is oriented coaxially in relation to the longitudinal axis L. The swirl body 31 is fixed in the main body 29 by means of a screwed-in retaining ring 33.

The main body 29 has an outer thread 35 for screwing it into the respective recess 25. In order to facilitate the screwing-in of the nozzle insert 5*a, b*, recesses 37 for engagement of a screwing tool are provided on the outlet-side face side of the nozzle insert 5*a, b* in each case.

The main body 29 has a spray mist outlet 39 through which the extinguishing fluid entering through the extinguishing fluid inlet 23 exits the spray mist nozzle 1 in the form of spray mist after flowing through the nozzle insert 5*a, b*. The spray mist is generated in that a first part $T_1$ of the entering extinguishing fluid is, in the direction of the arrows $T_1$, diverted by the swirl body 31 outward into the circumferential region thereof and into the vicinity of a wall of the main body 29, in order then, on flowing up to the spray mist outlet 39, to be directed so as to form a vortex. A second partial stream $T_2$ passes through the swirl body 31 in the center thereof, through a passage opening (cf. FIGS. 4A-E).

Figure 3A:
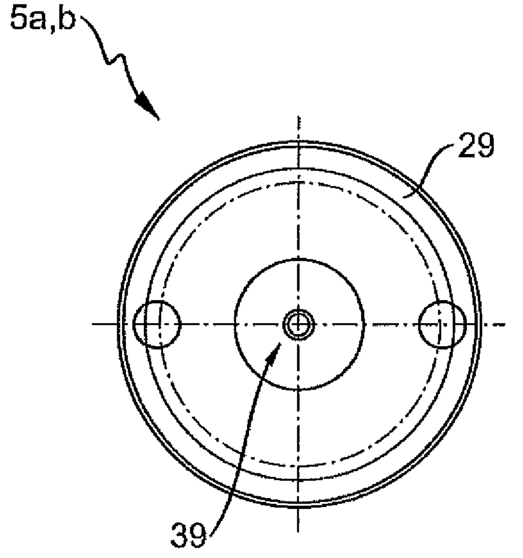
Figure 3C:
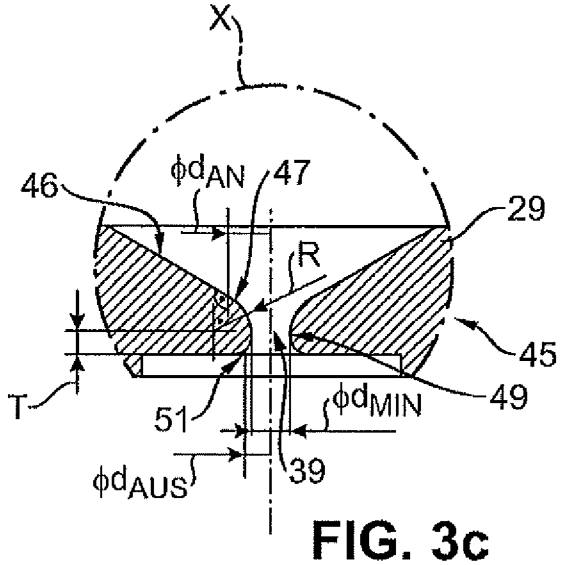
Figure 3B:
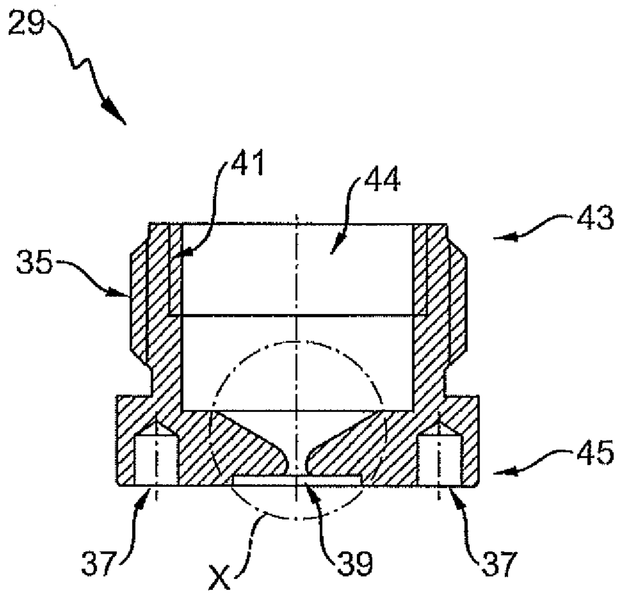

In the following text, the main body 29 will be discussed further with reference to FIGS. 3*a-c*. The main body 29 of the nozzle insert 5*a, b* has an inlet-side face surface 43 and an outlet-side face surface 45. Between these two face surfaces, there extends a passage opening 44 into which the swirl body 31 is received (cf. FIG. 2) and which opens out into the spray mist outlet 39. The spray mist outlet 39 is shown in detail in FIG. 3C.

Upstream of the spray mist outlet 39, the main body 29 has a seat surface 46 against which the swirl body 31 is supported. The seat surface 46 transitions into the spray mist outlet 39 at a point 47. The cross section at which the seat surface 46 transitions into the cross section of the spray mist outlet 39 is the so-called incident-flow cross section 47. At the incident-flow cross section 47, the spray mist outlet 39 has a diameter $d_{an}$. The transition from the seat surface 46 to the spray mist outlet 39 is preferably realized smoothly.

At its narrowest point, the spray mist nozzle 39 has a minimum flow cross section 49. The minimum flow cross section 49 is offset inwardly at a depth T from the outlet-side face surface 45.

Downstream of the minimum flow cross section 49, the spray mist outlet 39 is widened along a convexly extending curve and, at an exit cross section 51, has a diameter $d_{aus}$, which is greater than the diameter at the minimum flow cross section 49. The diameter at the minimum flow cross section 49 is denoted by $d_{min}$.

Preferably, the transition from the incident-flow cross section 47 to the minimum flow cross section 49 is realized along a convexly curved surface with a radius of curvature R. Furthermore preferably, the transition from the minimum flow cross section 49 to the exit cross section 51 is likewise realized along a convexly curved surface, in the present exemplary embodiment likewise with the radius of curvature R. Particularly preferably, the convexly curved surface from the incident-flow cross section 47 to the exit cross section 51 is formed smoothly, that is to say without any sharp bends. Particularly preferably, the curving is uninterrupted and constant with the same radius of curvature R. The contour, rounded owing to the convex curvature, of the spray mist outlet 39 causes an unexpectedly marked stabilization of the K-factor of the nozzle insert 5*a, b*.

Figure 4C:
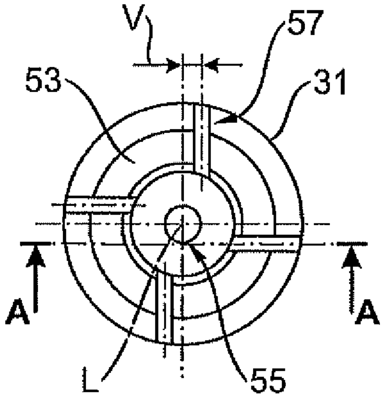
FIGS. 4*a-e* shows different schematic illustrations of a swirl body for the nozzle insert as per the preceding figures, FIGS. 5*a, b* show different schematic illustrations of a spray mist nozzle as per a second preferred exemplary embodiment.
Figure 4E:
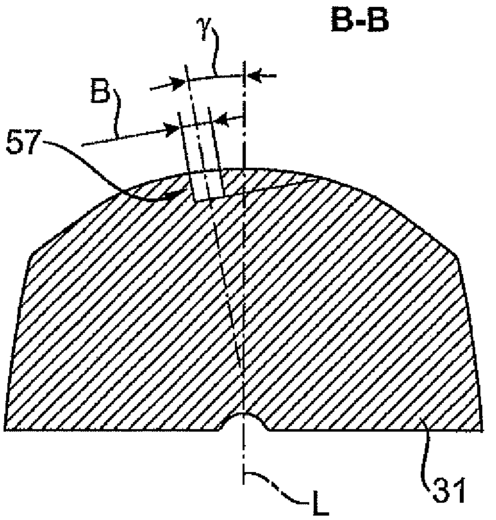
Figure 4A:
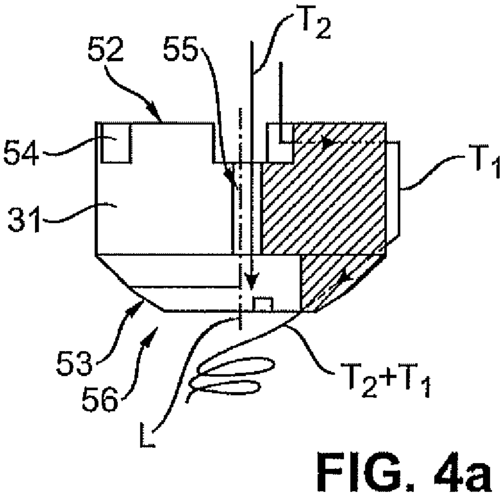
Figure 4D:
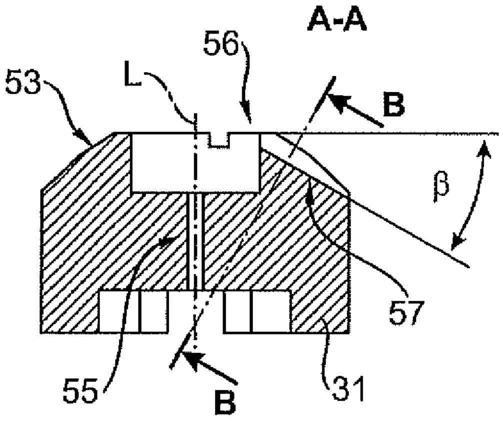
Figure 4B:
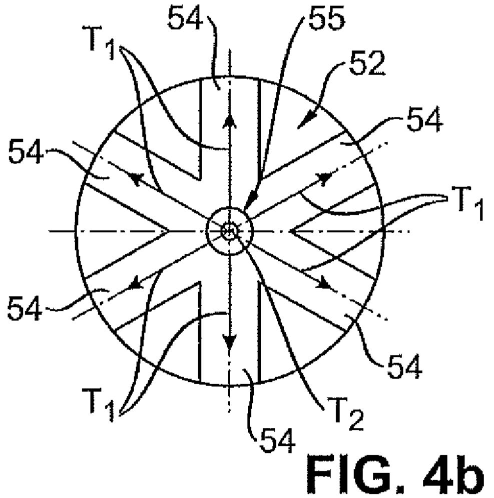

Next, FIGS. 4*a-e* describe in more detail the swirl body 31 for the nozzle insert 5*a, b* of the present exemplary embodiment. First of all, FIG. 4*a* shows a side view of the swirl body 31 with a partially exposed cross section. Extinguishing fluid flows onto the swirl body 31 at a first, inlet-side face side 52. A first part $T_1$ is diverted by multiple radially extending grooves 54 to the outer circumference of the swirl body 31. This is also shown in FIG. 4*b*. A second part $T_2$ flows, without diversion to the outer circumference, through a passage opening 55 to a second face side 56 of the swirl body 31. The first partial stream $T_1$, as can be clearly seen in particular in FIG. 4*c*, is conveyed by way of multiple vortex channels 57, which are arranged in a radial-parallel and eccentric manner relative to the longitudinal axis L, back in the direction of the spray mist outlet 39, wherein, due to the off-center arrangement of the vortex channels 57, a vortex flow is generated in the volume between the swirl body 31 and the main body 29 upstream of the spray mist outlet. In this free space, the two partial streams $T_1$ and $T_2$ are reunited and expelled together through the spray mist outlet 39.

The vortex channels 57 are preferably all offset from a respective radial by the same offset V. As can be seen clearly in FIG. 4*d*, the vortex channels 57 are inclined at an angle β relative to the outlet-side, second face side 56 of the swirl body 31. Preferably, the vortex channels 57 or the groove bases of the vortex channels 57 are oriented parallel to the seat surface 53 of the swirl body 31. Moreover, as FIG. 4*e* shows, the vortex channels 57 are provided with a width B in the swirl body 31 and are additionally turned through an angle γ in relation to the longitudinal axis.

The preceding figures have shown, on the basis of the preceding exemplary embodiment, a high-pressure spray mist nozzle 1 having a total of three nozzle inserts 5*a, b*. Also encompassed by the invention are, furthermore, spray mist nozzles which have a different number of nozzle inserts, for example five, seven or more nozzle inserts, and in which either in each case one nozzle insert is oriented coaxially in relation to the mounting direction M or in which all the nozzle inserts are oriented at an angle α to the mounting direction M or in which one or more recesses 25 are not provided with a nozzle insert 5*a, b* or are closed off by a blind plug or similar closure element.

FIGS. 1-4*e* show a spray mist nozzle according to a first preferred exemplary embodiment, which is in the form of an open spray mist nozzle. FIGS. 5*a, b* show, according to a second preferred exemplary embodiment, a spray mist nozzle 1' which is in the form a sprinkler. The spray mist nozzle 1' is identical to the spray mist nozzle 1 as per the preceding figures in terms of essential structural features. Identical reference signs refer to functionally and/or structurally identical elements, and for this reason, in this respect, reference is made to the above statements for the purpose of avoiding repetitions.

The spray mist nozzle 1' has a housing 3' which has a multiplicity of recesses 25. Inserted in most of the recesses 25 are nozzle inserts 5*b* as according to the first exemplary embodiment.

That recess 25 which is oriented in the mounting direction M has a sprinkler insert 59, however.

Figure 5B:
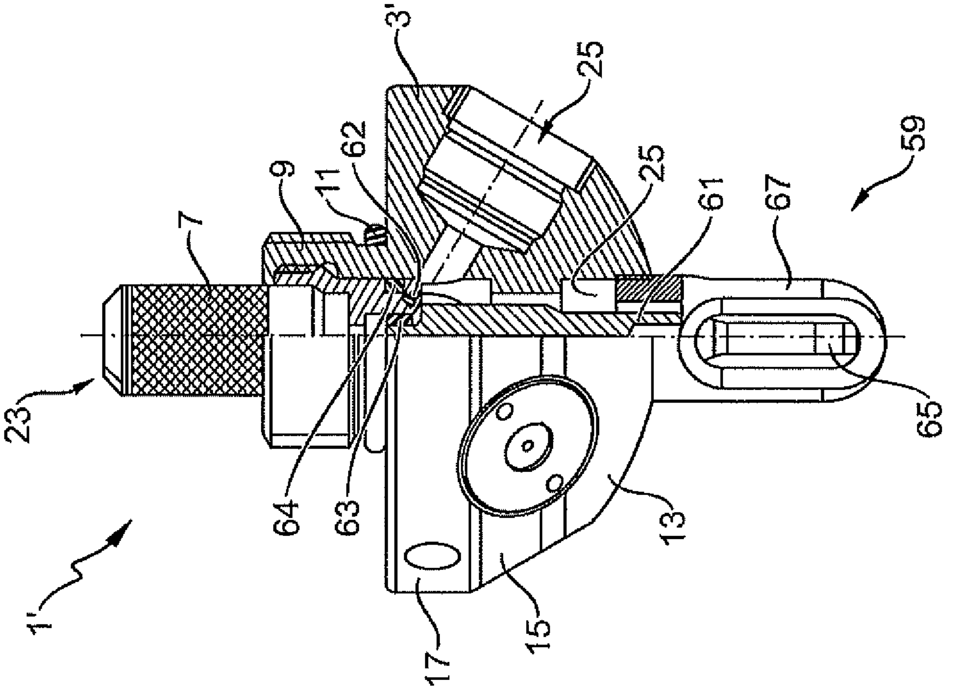
Figure 5A:
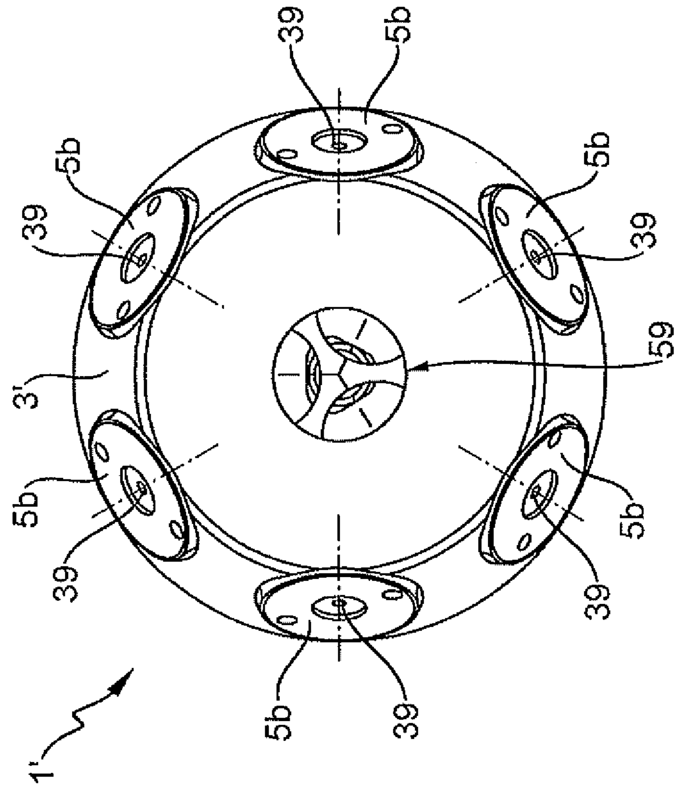

The sprinkler insert 59 comprises a blocking body 61 which extends in the interior of the housing 3' in the direction of the extinguishing fluid inlet 23 and which, in the closed position, shown in FIG. 5*b*, bears sealingly against a valve seat 62. A sealing element 63 is preferably provided between the valve seat 62 and the blocking body 61. The valve seat 62 is preferably formed in a screwed-in insert 64 which has been mounted in the housing 3' from the side of the extinguishing fluid inlet 23.

The sprinkler insert 59 furthermore comprises a sprinkler cage 67 in which there is arranged a thermally activatable trigger element 65 which holds the blocking body 61 in the closed position shown. Summarized briefly, the functioning of the sprinkler is constituted by the following: If the thermally activatable trigger element 65 is destroyed due to a spreading fire, the blocking body 61 can no longer resist the extinguishing fluid pressure applied from the side of the extinguishing fluid inlet 23 and switches from the closed position into a release position. In the release position, extinguishing fluid can reach the remaining recesses 25, which are oriented at an angle to the recess oriented in the mounting direction M and are preferably distributed uniformly over the circumference of the housing 3', and exit through the respective nozzle inserts 5*b* and the extinguishing fluid outlets 39 thereof.

Figure 6:
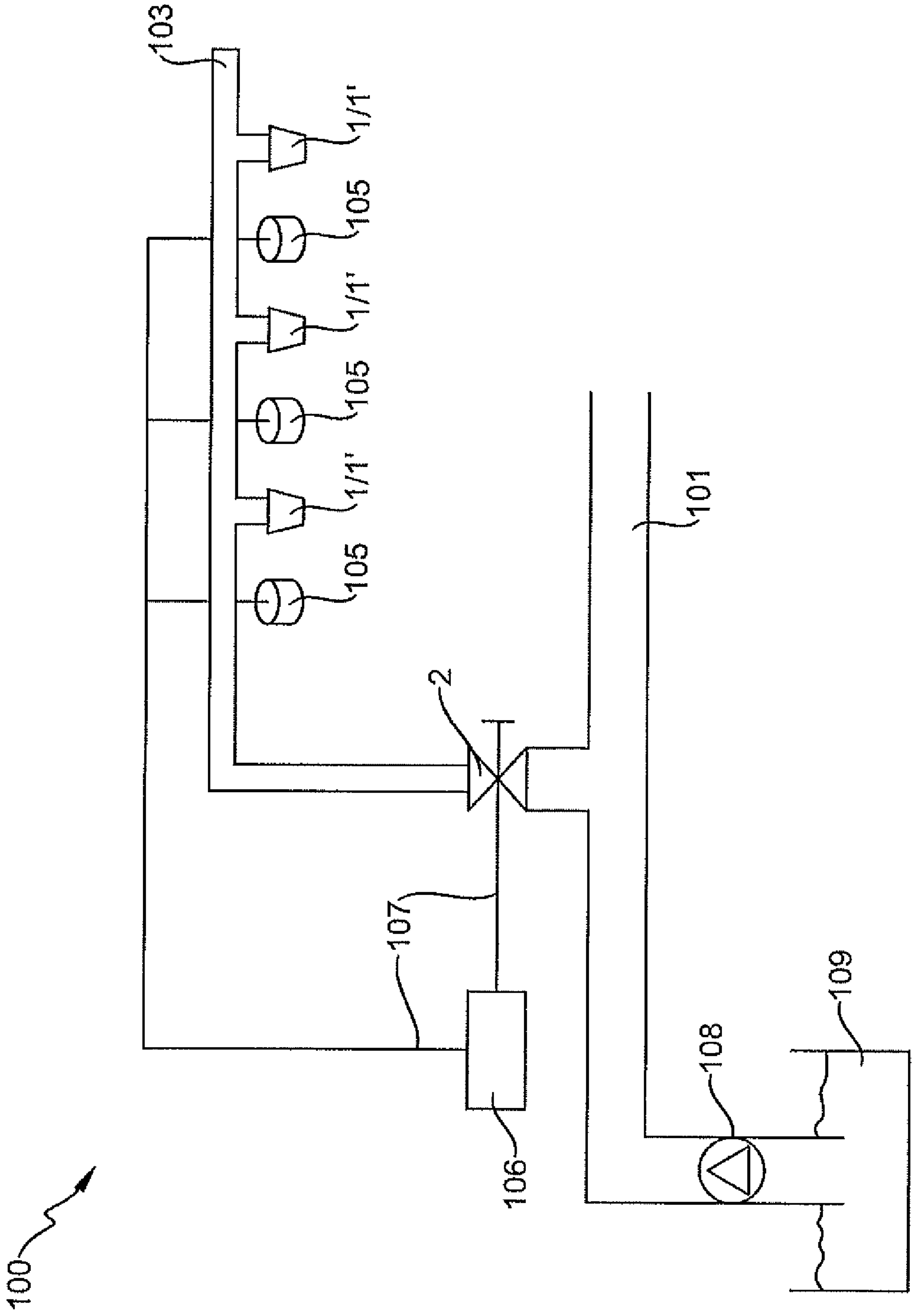
FIG. 6 shows an exemplary firefighting system with spray mist nozzles as the preceding figures.

Having shown the spray mist nozzle in FIGS. 1-4*e* in detail, an exemplary application of the spray mist nozzle is now illustrated. FIG. 6 shows a firefighting system 100.

The firefighting system 100 has a supply line 101 which is fed by an extinguishing agent source 109. Preferably, for this purpose, provision is made of a pump 108 (or multiple pumps) which is (are) connected in a fluid-conducting manner to the extinguishing agent supply 109 and which, during operation, conveys (convey) extinguishing agent into the supply line 101. A line network 103, also referred to as distribution network, is supplied with extinguishing agent via a valve station 102. One or more spray mist nozzles 1 according to the present invention are installed in the line network 103.

The spray mist nozzles 1 in the system illustrated here may for example be in the form of sprinklers according to preferred embodiments of the invention. Such a firefighting system would be usable for example as a sprinkler system in the roll-on/roll-off area of ships. Alternatively, the use of the firefighting system 100 as a high-pressure spray mist nozzle system in buildings or for example for firefighting in air extraction systems also comes into consideration. For such a usage purpose, the firefighting system 100 is preferably furthermore equipped with one or more fire characteristic detectors 105, wherein, according to the invention, a fire characteristic, beside the temperature, is to be understood as being for example also electromagnetic radiation, smoke aerosols or fire gases.

The detectors 105 are connected in a signal-conducting manner to a control center 106 via corresponding signal lines 107. If the presence of a fire characteristic or the exceedance of a representative threshold value is detected by one or more detectors 105, the control center 106 actuates the valve station 102 and causes the control valve arranged there to be opened, whereby extinguishing fluid can pass into the line network 103 and to the spray mist nozzles 104.

If the firefighting system 100 is operated as a sprinkler system, extinguishing fluid is normally also present in the line network in the closed state of the sprinklers.

LIST OF REFERENCE NUMBERS AND SYMBOLS

1 Spray mist nozzle
3 Housing
5*a,b* Nozzle insert
7 Filter screen
9 Thread
11 Sealing ring
13 Partially spherical portion
15 Frustoconical portion
17 Cylindrical portion
19 Inner thread
23 Extinguishing fluid inlet
25 Recess for nozzle insert
27 Inner thread
29 Main body
31 Swirl body
33 Retaining ring
35 Outer thread
37 Recess
39 Spray mist outlet
41 Inner thread
43 Inlet-side end, main body
44 Passage opening
45 Outlet-side end, main body
46 Seat surface, main body
47 Incident-flow cross section
49 Minimum flow cross section
51 Exit cross section
52 First face side, swirl body
53 Seat surface, swirl body
54 Groove
55 Passage opening, swirl body
56 Second face side, swirl body
57 Vortex channel
59 Sprinkler insert
61 Blocking body
62 Valve seat
63 Sealing element
64 Insert
65 Trigger element
67 Sprinkler cage
100 Firefighting system
101 Extinguishing fluid supply line
102 Valve station
103 Line network
105 Fire characteristic detector
106 Control center
107 Signal line
108 Pump
109 Extinguishing fluid source
$\alpha$, $\beta$, $\gamma$ Angles
$d_{an}$ Incident-flow cross section
$d_{min}$ Minimum flow cross section
$d_{aus}$ Exit cross section
B Width, vortex channel
L Longitudinal direction
M Mounting direction, spray mist nozzle
$T_1$, $T_2$ Partial streams, extinguishing fluid
T Depth, minimum flow cross section
V Offset, vortex channel

The invention claimed is:

1. A spray mist nozzle for firefighting systems, comprising:

a housing configured with an extinguishing fluid inlet for receiving an extinguishing fluid and at least one recess including a nozzle insert, wherein the nozzle insert comprises a main body with a longitudinal axis, a spray mist outlet in the longitudinal axis for the extinguishing fluid, and a swirling body arranged in the main body configured to swirl the extinguishing fluid prior to exiting from the spray mist outlet, wherein the swirl body comprises a first face side and an opposite second face side which are configured to guide a first part of the extinguishing fluid laterally along the swirl body and to swirl said first part, wherein to guide the first part of the extinguishing fluid, the first face side comprises a plurality of grooves perpendicular to the longitudinal axis, wherein to swirl the first part of the extinguishing fluid, the opposite second face side comprises a plurality of vortex channels oblique to the longitudinal axis, wherein the first face side is upstream of the opposite second face side, and wherein the swirl body further comprises a passage opening which extends through the swirl body from the first face side to the opposite second face side and, wherein the passage opening is aligned with the spray mist outlet of the main body and through which a second part of the extinguishing fluid flowing through the main body passes through the swirl body.

2. The spray mist nozzle as claimed in claim 1, wherein the spray mist outlet has an opening cross section defining a minimum diameter of the spray mist outlet, and has an exit cross section defining an exit diameter of the spray mist outlet greater than the minimum diameter of the spray mist outlet, wherein the exit cross section is located downstream of the opening cross section, and wherein a transition from the opening cross section to the exit cross section runs along a convexly curved surface.

3. The spray mist nozzle as claimed in claim 2, wherein the transition from the opening cross section to the exit cross section runs along the convexly curved surface with a constant surface curvature.

4. The spray mist nozzle as claimed in claim 3, wherein the constant surface curvature downstream of the opening cross section has a radius of curvature in a range of 0.7 mm to 0.8 mm.

5. The spray mist nozzle as claimed in claim 2, wherein the spray mist outlet has an incident-flow cross section upstream of the opening cross section.

6. The spray mist nozzle as claimed in claim 5, wherein a transition from the incident-flow cross section to the opening cross section runs along a convexly curved surface.

7. The spray mist nozzle as claimed in claim 6, wherein the transition from the incident-flow cross section to the opening cross section runs along the convexly curved surface with a constant surface curvature.

8. The spray mist nozzle as claimed in claim 7, wherein the constant surface curvature upstream of the opening cross section has a radius of curvature in a range of 0.7 mm to 0.8 mm.

9. The spray mist nozzle as claimed in claim 5, wherein the convexly curved surface between the incident-flow cross section and the exit cross section has a constant surface curvature.

10. The spray mist nozzle as claimed in claim 2, wherein the passage opening has a passage cross section which is smaller than or the same size as the exit cross section of the spray mist outlet.

11. The spray mist nozzle as claimed in claim 1, wherein the passage opening comprises an axis oriented coaxially in relation to the longitudinal axis of the main body.

12. The spray mist nozzle as claimed in claim 1, wherein the extinguishing fluid inlet defines a mounting direction, wherein the at least one recess including the nozzle insert comprises a first nozzle recess, and the nozzle insert comprises a first nozzle insert oriented parallel to the mounting direction.

13. The spray mist nozzle as claimed in claim 12, wherein the at least one recess comprises a second nozzle recess with a second nozzle insert oriented at a predetermined angle of 55° to 70° to the mounting direction.

14. The spray mist nozzle as claimed in claim 13, wherein the first nozzle insert has a first K-factor which is three to four times larger than a second K-factor of the second nozzle insert.

15. The spray mist nozzle as claimed in claim 13, wherein the first nozzle insert has a first K-factor and the second nozzle insert has a second K-factor, wherein the first K-factor is the same as the second K-factor.

16. The spray mist nozzle as claimed in claim 15, wherein the first and second nozzle inserts are designed for an operating pressure in a region of 30 bar to 70 bar.

17. The spray mist nozzle as claimed in claim 1, wherein the spray mist nozzle is formed partly or completely from steel.

18. The spray mist nozzle as claimed in claim 1, wherein the spray mist nozzle comprises an additional recess including a sprinkler insert, the sprinkler insert having a blocking body which can be moved back and forth between a closed state and a release state and which is configured to separate the extinguishing fluid inlet from the at least one recess including the nozzle insert in the closed state and to connect the extinguishing fluid inlet to the at least one recess including the nozzle insert in a fluid-conducting manner in the release state.

19. The spray mist nozzle as claimed in claim 18, wherein the extinguishing fluid inlet defines a mounting direction, and wherein the additional recess is oriented in the mounting direction.

20. The spray mist nozzle as claimed in claim 19, wherein the at least one recess including the nozzle insert comprises four or more recesses, which are oriented at an angle to the additional recess and are distributed uniformly along a circumference of the spray mist nozzle.

21. The spray mist nozzle as claimed in claim 1, wherein each of the plurality of vortex channels is parallel to and off-set from a respective plane containing the longitudinal axis.

22. The spray mist nozzle as claimed in claim 21, wherein each of the plurality of vortex channels is inclined at an angle relative to the second face side of the swirl body.

23. The spray mist nozzle as claimed in claim 21, wherein a channel base of each of the plurality of vortex channels is oriented parallel to a seat surface of the swirl body.

24. The spray mist nozzle as claimed in claim 21, wherein the plurality of grooves extend radially from the longitudinal axis to an outer circumference of the swirl body, wherein the first part of the extinguishing fluid flows through the plurality of radially extending grooves and the plurality of vortex channels.

25. The spray mist nozzle as claimed in claim 21, wherein the first part of the extinguishing fluid and the second part of the extinguishing fluid reunite in a free space between the swirl body and the main body and are expelled together through the spray mist outlet.

26. A firefighting system comprising:

an extinguishing fluid supply line, a line network with one or more open spray mist nozzles installed in the line network, a valve station which is configured to be actuated in the event of a fire in order to connect the extinguishing fluid supply line to the line network in a fluid-conducting manner and, in this way, to supply the one or more open spray mist nozzles with extinguishing fluid, wherein each of the one or more open spray mist nozzles comprises:

a housing configured with an extinguishing fluid inlet for receiving the extinguishing fluid and at least one recess including a nozzle insert, wherein the nozzle insert comprises a main body with a longitudinal axis, a spray mist outlet in the longitudinal axis for the extinguishing fluid, and a swirl body arranged in the main body configured to swirl the extinguishing fluid prior to exiting from the spray mist outlet, wherein the swirl body comprises a first face side and an opposite second face side which are configured to guide a first part of the extinguishing fluid laterally along the swirl body and to swirl said first part, wherein to guide the first part of the extinguishing fluid, the first face side comprises a plurality of grooves perpendicular to the longitudinal axis, wherein to swirl the first part of the extinguishing fluid, the opposite second face side comprises a plurality of vortex channels oblique to the longitudinal axis, wherein the first face side is upstream of the opposite second face side, and wherein the swirl body further comprises a passage opening which extends through the swirl body from the first face side to the opposite second face side and, wherein the passage opening is aligned with the spray mist outlet of the main body and through which a second part of the extinguishing fluid flowing through the main body passes through the swirl body.

* * * * *